(12) United States Patent
Hawthorne et al.

(10) Patent No.: US 7,108,835 B2
(45) Date of Patent: Sep. 19, 2006

(54) FISCHER-TROPSCH SLURRY REACTOR COOLING TUBE ARRANGEMENT

(75) Inventors: William H. Hawthorne, Thornton, CO (US); Mark D. Ibsen, Highlands Ranch, CO (US); Peter S. Pedersen, Boulder, CO (US); Mark S. Bohn, Golden, CO (US)

(73) Assignee: Rentech, Inc., Denver, CO (US)

( * ) Notice: Subject to any disclaimer, the term of this patent is extended or adjusted under 35 U.S.C. 154(b) by 218 days.

(21) Appl. No.: 10/681,823

(22) Filed: Oct. 8, 2003

(65) Prior Publication Data

US 2005/0080147 A1   Apr. 14, 2005

(51) Int. Cl.
| | |
|---|---|
| *F27B 15/14* | (2006.01) |
| *F27B 15/08* | (2006.01) |
| *B01J 1/36* | (2006.01) |
| *F28D 7/00* | (2006.01) |
| *F28D 11/00* | (2006.01) |

(52) U.S. Cl. ............................ 422/146; 49/147; 49/200; 49/201; 165/86; 165/104.16; 165/104.18; 518/728

(58) Field of Classification Search .................. 422/49, 422/146, 147, 200, 201; 165/86, 104.16, 165/104.18; 518/728
See application file for complete search history.

(56) References Cited

U.S. PATENT DOCUMENTS 4,359,448 A  *  11/1982  Schuurman et al. ........ 422/143

| | | | |
|---|---|---|---|
| 4,187,902 A | 12/1982 | Miller, Jr. et al. | ............ 165/76 |
| 4,632,587 A | 12/1986 | Vollhardt | .................... 422/202 |
| 5,409,960 A | 4/1995 | Stark | |

FOREIGN PATENT DOCUMENTS

EP      0 614 864 A1    3/1994

OTHER PUBLICATIONS

Elsevier, Catalysis Today 66, C. Maretto & R. Krishna, Design and Optimisation of a Multi–Stage Bubble Column Slurry Reactor for Fischer–Tropsch Synthesis, 2001, pp. 241–248.

Bhatt et al., "Catalyst and Process Scale–up for Fischer–Tropsch Synthesis," Symposium on Fischer–Tropsch and Alcohol Synthesis, 1994 Spring ACS Meeting, San Diego, CA, Mar. 15–17, 1994.

Kolbel and Ralek, "The Fischer–Tropsch Synthesis in the Liquid Phase,"Catal. Rev. Sci. Eng, 21, 225 (1980).

International Premliminary Examination Report dated Jan. 31, 2005 for International Application No. PCT/US2004/032999.

Written Opinion of the International Searching Authority dated Jan. 31, 2005 for International Application No. PCT/US2004/032999.

* cited by examiner

*Primary Examiner*—J. Parsa
(74) *Attorney, Agent, or Firm*—Aileen Law Patent Law Offices of Rick Martin, P.C.

(57) ABSTRACT

An arrangement of cooling tubes within a Fischer-Tropsch slurry reactor simplifies removal and reinstallation of cooling tubes for reactor maintenance.

22 Claims, 8 Drawing Sheets

FISCHER-TROPSCH SLURRY REACTOR COOLING TUBE ARRANGEMENT

FIELD OF THE INVENTION

The present invention relates to an arrangement of cooling tubes within a Fischer-Tropsch (FT) slurry reactor, and more specifically, to providing an arrangement that simplifies cooling tube removal and reinstallation for maintenance purposes.

BACKGROUND OF THE INVENTION

A commercial FT slurry reactor can have hundreds to thousands of cooling tubes spanning most of the vertical extent of the reactor, e.g. 75 feet. These cooling tubes will typically be about 3 to 5 inches in diameter.

Reactor cooling tubes are used to generate saturated steam thereby providing cooling of the contents of a slurry reactor. Specifically, saturated steam is produced when preheated boiler feed water is supplied to the cooling tubes. This steam production absorbs the exothermic heat of reaction within the reactor.

The combination of the large number of tubes, their associated weight, the need to supply boiler feed water at one location and to remove steam from another location, leads to a fairly complex reactor design. The design is even more involved and difficult when the need to remove the cooling tubes from the reactor for maintenance is addressed.

The present invention discloses a cooling tube design that addresses these concerns and facilitates the removal of cooling tubes from a reactor, thereby providing a simple construction for a method of cooling tube installation and maintenance.

A variety of Fischer-Tropsch reactor cooling tube designs are known. However, reactor internal details are generally not made public. Most typically employ the generation of saturated steam within cooling tubes.

Maretto and Krishna, "Design and optimization of a multi-stage bubble column slurry reactor for Fischer-Tropsch synthesis," Catalysis Today, 66 (2001) 241–248, show schematically the arrangement of cooling tubes in a bubble column slurry reactor; see their FIG. 1.

Bhatt et al., "Catalyst and Process Scale-up for Fischer-Tropsch Synthesis," Symposium on Fischer-Tropsch and Alcohol Synthesis, 1994 Spring ACS Meeting, San Diego, Calif., Mar. 15–17, 1994, show the arrangement of cooling tubes in a reactor cooled by heat transfer oil.

Kolbel and Ralek, "The Fischer-Tropsch Synthesis in the Liquid Phase," Catal. Rev. Sci. Eng, 21, 225(1980), show the arrangement of cooling tubes in a reactor as well as the supporting equipment needed to provide boiler feed water and to control the generated steam from the system.

An example of an alternate approach is disclosed in U.S. Pat. No. 5,409,960 to Thomas M. Stark which teaches a method for removing heat from a slurry FT hydrocarbon reactor by using pentane in a gas conversion process to absorb the exothermic heat of reaction in the FT process. Pub. 00614864/EP A1 (Thomas Marshall Stark), which published Sep. 9, 1994, discloses a process that consumes a cooling medium, such as pentane, and vaporizes the cooling medium by the exothermic heat of reaction. Said vaporized medium may then be expanded to produce energy, for example, to drive an air plant compressor to produce oxygen for use in the gas conversion process.

SUMMARY OF THE INVENTION

In the disclosed invention, reactor cooling tubes are preferably bundled into groups of four tubes or twelve tubes. A primary reason for bundling the cooling tubes is to facilitate removal of the tubes as bundles for tube repair or reactor maintenance. A majority of the cooling tube bundles within a reactor are made up of the twelve-tube bundles. The four-tube bundles are used in more narrow spaces requiring a smaller configuration of tubes.

The process of removing a cooling tube bundle from a reactor begins by removing boiler feedwater and steam runners. The tube bundle can then be moved horizontally along a bundle support rail or beam until the tube bundle is situated directly beneath one of the reactor's bundle removal nozzles. In the present invention, a reactor has several bundle removal nozzles. Each bundle removal nozzle penetrates the reactor head. A particular bundle removal nozzle is chosen for its alignment with the cooling tube bundle requiring removal, referred to hereinafter as the designated or target cooling tube bundle.

Because each cooling tube bundle is attached to a boiler feed water runner and a steam runner, both runners must be disengaged from the target cooling tube bundle. The runners are then removed to provide access to the target cooling tube bundle. The runner piping does not need to be removed from the reactor. The piping needs only be lifted out of the way and set to one side. In other words, the runner piping is moved out of the way so it does not impede the removal of the target cooling tube bundle from the reactor by means of the appropriate bundle removal nozzle.

A cooling tube bundle may be moved by using fasteners, e.g. eyebolts, that are welded or otherwise secured to the inside of the reactor. The eyebolt fastener is offered by way of example and not of limitation; any fastener or attachment means could be employed. Further, securing the eyebolt by welding is only an example, as any suitable method of fixing the fastener or attachment means to the inside of the reactor could be utilized. By using the welded eyebolts of the disclosed embodiment, the cooling tube bundle can be rigged so that it may be lifted some distance to facilitate the placement of a moving device, i.e., a dolly, underneath the cooling tube bundle. The dolly is offered by way of example and not of limitation; any suitable moving device means could be employed. The moving device is supported underneath the cooling tube bundle by a bundle support rail. The moving device can then ride along the bundle support rail to facilitate the moving, or removal, of a cooling tube bundle. The rigging is also useful in maneuvering the cooling tube bundle to facilitate its removal.

Once a cooling tube bundle is situated directly beneath one of the reactor's bundle removal nozzles, the cooling tube bundle may be removed from the reactor by using a lifting device, i.e., a crane, to lift the cooling tube bundle out through the bundle removal nozzle. The crane is offered by way of example and not of limitation; any suitable lifting device means could be employed. A replacement cooling tube bundle is installed using a reverse procedure of that described for removal of a cooling tube bundle.

Generally, a new cooling tube bundle would immediately be installed in the reactor. Otherwise, the target cooling tube bundle would have to be sent for repair before its reinstallation into the reactor can take place. Immediate installation of a replacement cooling tube bundle has logistical and production advantages. Immediate installation of a replacement cooling tube bundle avoids further reactor down time, as the reactor can be put back in operation as soon as the installation is complete. Immediate installation of a replacement cooling tube bundle also keeps the reactor and remaining cooling tube bundles in good operational condition as the reactor and remaining tubes are not exposed to the atmosphere and contaminants for an extended period of time. In addition, technicians need not be called back in to complete the reinstallation after the target cooling tube bundle is returned from being repaired. However, immediate installation of a replacement cooling tube bundle may require having at least one replacement cooling tube bundle readily available.

To move the target cooling tube bundle, it may be necessary to first remove non-targeted cooling tube bundles that obstruct the path of the cooling tube bundle requiring repair. Immediate installation of a replacement cooling tube bundle minimizes the risk of having damage occur to any undamaged or non-targeted cooling tube bundles that had to be removed.

The main aspect of the present invention is to provide a cooling tube arrangement that is configured to facilitate the removal of a plurality of cooling tubes from a Fischer-Tropsch reactor as a removable bundle.

Another aspect of the present invention is to provide a bundle of removable cooling tubes wherein the quantity of cooling tubes in a cooling tube bundle is dependent on an inside diameter of a Fischer-Tropsch reactor, an outside diameter of each cooling tube, and a requisite number of cooling tubes.

Still another aspect of the present invention is to provide a cooling tube arrangement comprising a first plenum to force boiler feed water from a boiler feed water manifold through a supply means and into a center tube of a cooling tube, whereby saturated steam is generated in a cooling tube annulus when the cooling tube absorbs an exothermic heat of reaction within a Fischer-Tropsch reactor and is then carried to a second plenum, whereby the saturated steam is forced into a steam manifold and out of the reactor via a steam conduit.

Yet another aspect of the present invention is to provide a Fischer-Tropsch reactor having a plurality of support rails at a lower cross section of the reactor's head to provide support for and to enable a horizontal movement of a removable cooling tube bundle so it may be positioned underneath one of a plurality of bundle removal nozzles at a head section of the reactor for removal therethrough.

Another aspect is to provide a means for rigging a removable cooling tube bundle to the inside surface of a Fischer-Tropsch reactor, thereby creating an anchor when the removable cooling tube bundle is moved within the reactor or lifted out of the reactor.

Still another aspect is to provide a method of replacing cooling tubes from a Fischer-Tropsch reactor.

Other aspects of this invention will appear from the following description and appended claims, reference being made to the accompanying drawings forming a part of this specification wherein like reference characters designate corresponding parts in the several views.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION OF THE DRAWINGS

Figure 1A:
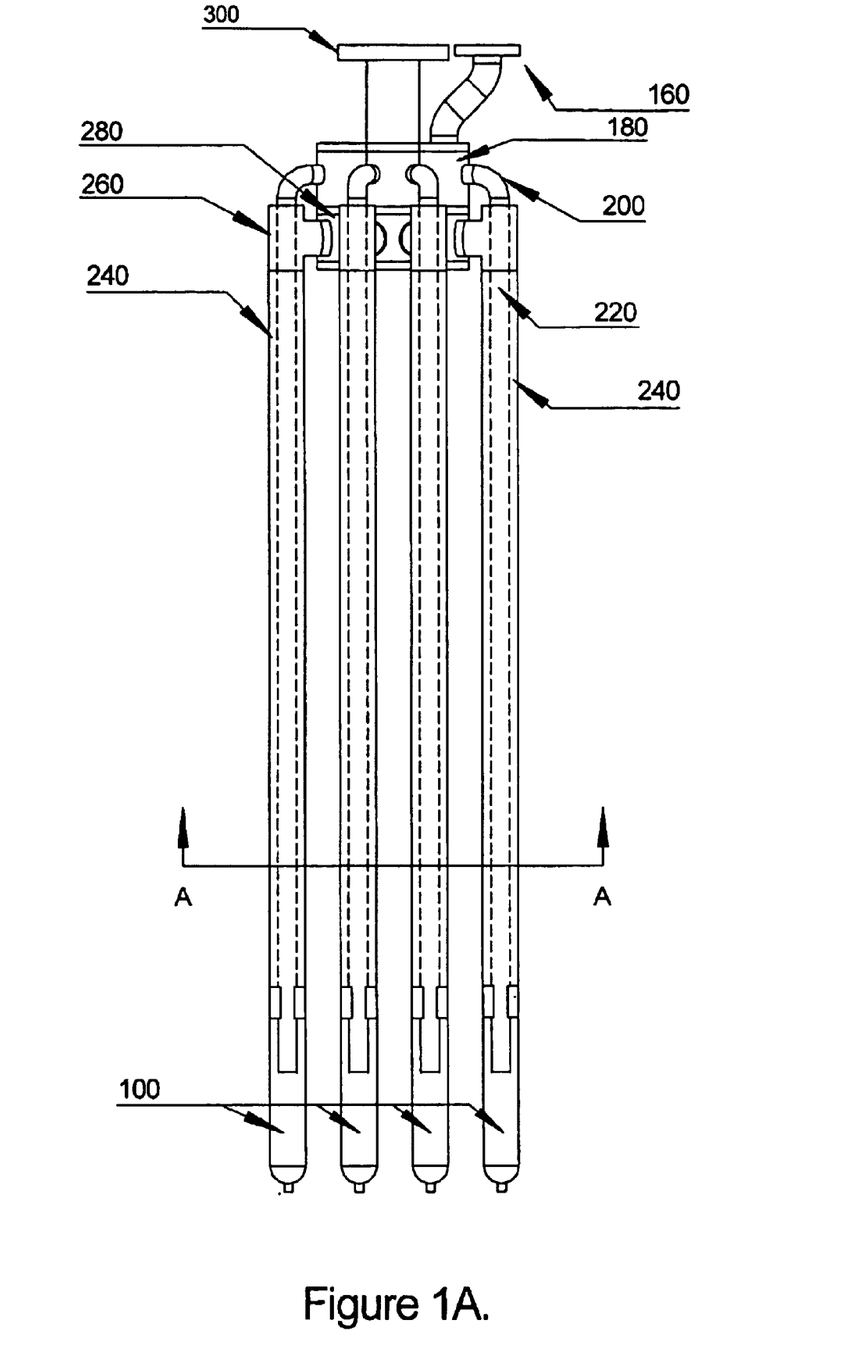
FIG. 1A is an elevation view of a cooling tube bundle removed from a reactor.
Figure 1B:
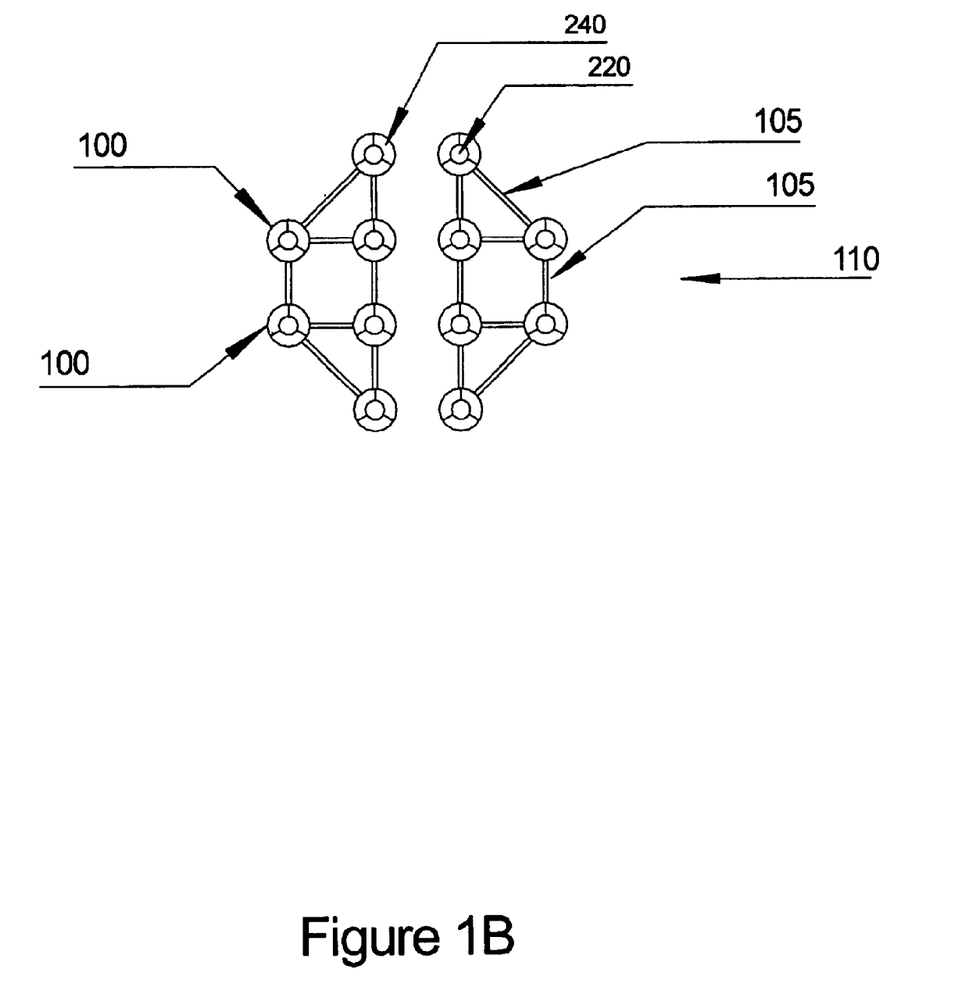
FIG. 1B is a cross sectional view of FIG. 1A taken along line A—A.

In the disclosed embodiment of FIGS. 1A, 1B, reactor cooling tubes 100 are grouped into a set of twelve tubes. Each group of twelve tubes is a bundle, 110, as shown in the cross sectional view of FIG. 1B. Although not specifically shown, a four-tube configuration of cooling tubes may also be used; such a configuration is also referred to as a bundle. Depending on the reactor inside diameter, cooling tube outside diameter, and the number of cooling tubes required, a tube bundle might have more or less than twelve tubes. For the example shown here, the twelve-tube bundle provided the most efficient use of reactor cross-sectional area. The four-tube bundles help to fill in empty portions of the reactor cross-sectional area without unnecessarily complicating fabrication and spare parts requirements.

Boiler feed water (source not shown) is supplied to tubes 100, wherein saturated steam is produced. Referring back to FIG. 1A, boiler feed water (BFW) enters annular plenum 180 via inlet 160. From there, BFW passes through supply means 200 and is distributed to center tube 220 within each cooling tube 100. Thus, BFW flows down through cooling tube 100 by means of center tube 220. As a result of heat transfer from the reactor slurry to the boiler feed water, steam (not shown) is generated in annulus 240 between center tube 220 and cooling tube 100. As steam and water flow up through annulus 240, it passes through tee coupling 260 and enters annular plenum 280. Steam and water exit the cooling tube arrangement via outlet 300.

Figure 2A:
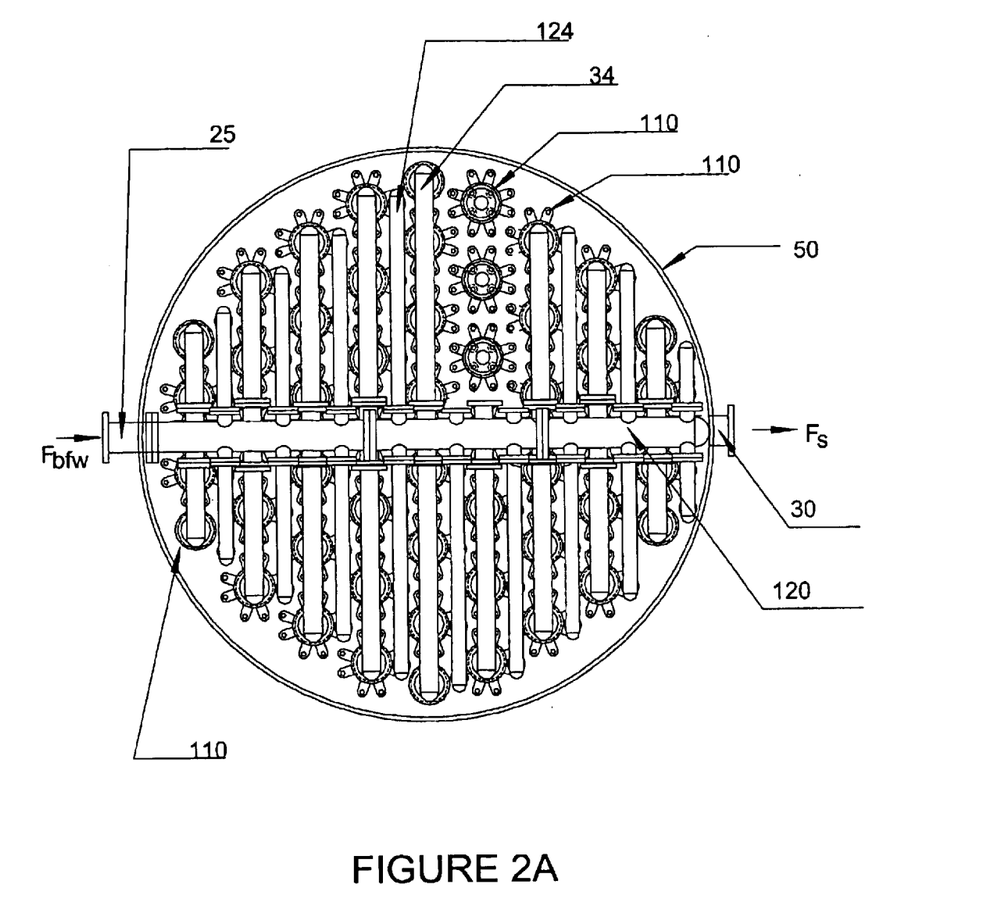
FIG. 2A is a plan view of the reactor wherein the top of the reactor is removed to show an arrangement of cooling tube bundles and boiler feedwater and steam manifolds inside a reactor.

FIG. 2A shows how cooling tube bundle 110 is configured in reactor 50, thereby facilitating removal of cooling tube bundle 110 during tube or reactor maintenance. Conduit 25 conveys BFW from a source, (not shown) in direction $F_{bfw}$ to BFW manifold 120 in reactor 50. A portion of BFW that passes through each cooling tube arrangement 110 is converted to steam. Conduit 30 then transfers the BFW/steam mixture received in manifold 340, from reactor 50 in direction $f_s$. Manifold 340, which underlies manifold 120 as shown on FIG. 2C, is hereinafter referred to as a steam manifold.

Figure 2B:
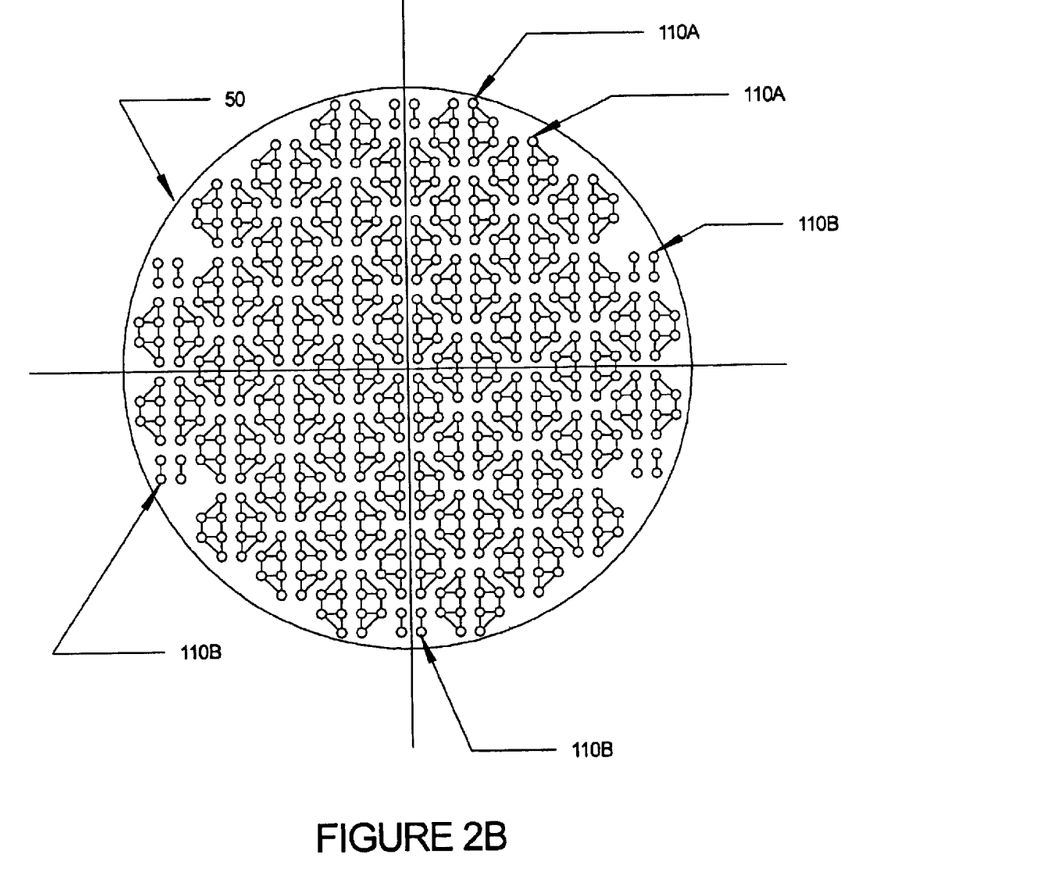
FIG. 2B is a cross sectional plan view of the cooling tube arrangement of FIG. 2A.
Figure 2C:
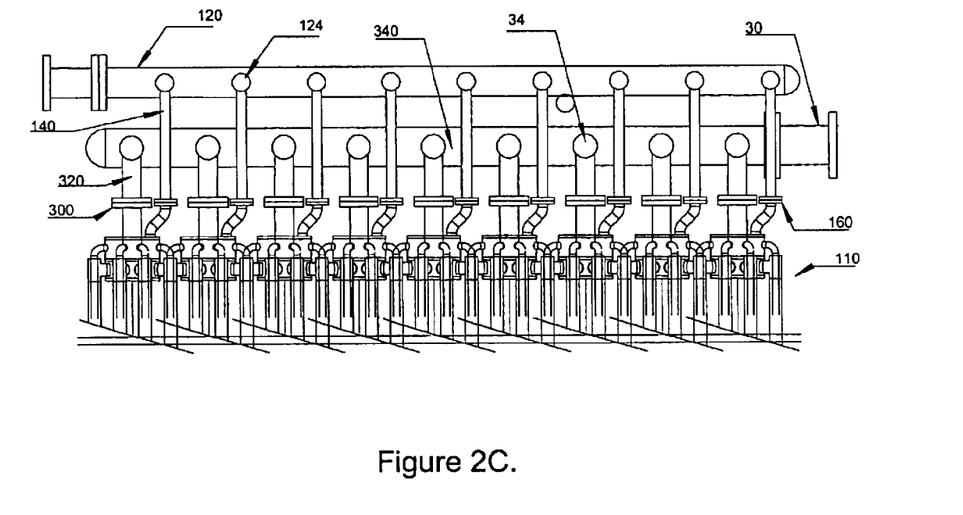
FIG. 2C is an elevation view showing how cooling tube bundles are attached to the boiler feed water and steam manifolds.

In FIG. 2B, individual cooling tubes are bundled in twelve-tube configurations 110A and four-tube configurations 110B. Four-tube configurations 110B can be placed where a smaller configuration of tubes is required, e.g., as the outermost set of tubes along an axis of the reactor.

The disclosed arrangement of cooling tube bundles 110 in reactor 50 makes use of 576 cooling tubes, each having a 4-inch diameter. The cooling tubes of the disclosed embodiment are of standard schedule 40 carbon-steel pipe. The pipe schedule number is offered by way of example and not of limitation. Further, depending on the internal pressure, and cooling tube diameter, other suitable pipe, such as stainless steel, may be used.

Reactor 50 has an inside diameter of 21.5 ft. Thus, the disclosed embodiment of the present invention has nine rows of cooling tube bundles. Alternate embodiments of cooling tube arrangements may be employed as the cooling tube diameter or reactor size is varied. In addition, alternate groupings of cooling tubes may be used to accommodate BFW and steam manifold requirements, as well as tube and reactor sizes. Thus, in the disclosed embodiment, twelve-tube cooling tube bundle 110A has a diameter of 2.75 ft. and four-tube cooling tube bundle 110B has a diameter of 1.325 ft. Further, the number of rows of cooling tube bundles may be varied. As stated above, a tube bundle might have more or less than twelve tubes depending on the reactor inside diameter, cooling tube outside diameter, and the number of cooling tubes required. FIG. 2C shows how cooling tube bundle 110 is attached to boiler feed water manifold 120 and steam manifold 340. BFW conduit 140 receives BFW from boiler feed water manifold 120 (see FIG. 2A) via a boiler feed water runner 124 and conveys BFW to inlet 160 of a cooling tube bundle 110 where steam generation occurs. Steam conduit 320 conveys saturated steam and excess BFW from outlet 300 to steam runner 34 and steam manifold 340. Steam entering conduit 30 (see FIG. 2A) exits reactor 50. In the disclosed embodiment, steam manifold 340 has a 14"diameter. BFW manifold 120 has a 12"diameter. Each is constructed of carbon steel. However, other pipe sizes and materials of construction may also be employed.

As shown in the cross sectional view in FIG. 1B, individual cooling tubes 100 of cooling tube bundle 110 are supported laterally by vertical plates 105. In this design, plates 105 are preferably about 4" high and about ½" thick and are located about every 15 feet up a cooling tube 100 length. Although each plate 105 is preferably welded to two cooling tubes 100, a plate 105 may be fastened in any number of ways to any suitable number of cooling tubes. Moreover, the design shown here is offered by way of example and not of limitation; any suitable plate height, thickness, or location along a cooling tube length could be employed.

Figure 3:
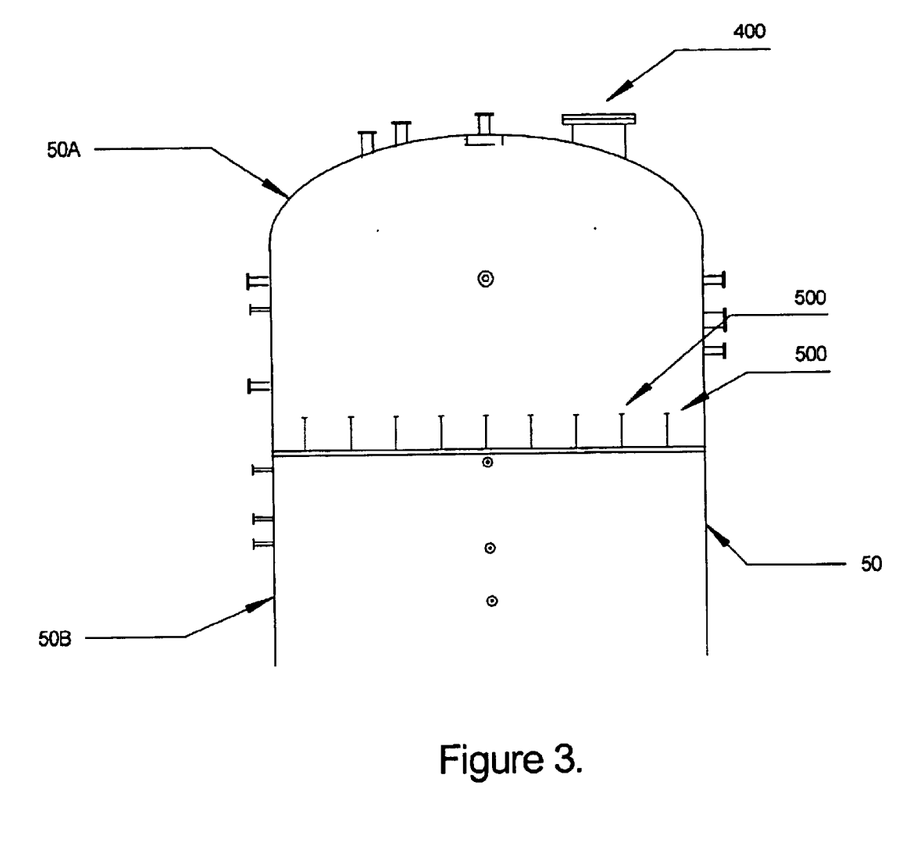
FIG. 3 is a cross sectional elevation view of a reactor showing a bundle removal nozzle at the reactor head and bundle support rails at a lower cross section of the reactor head.
Figure 4A:
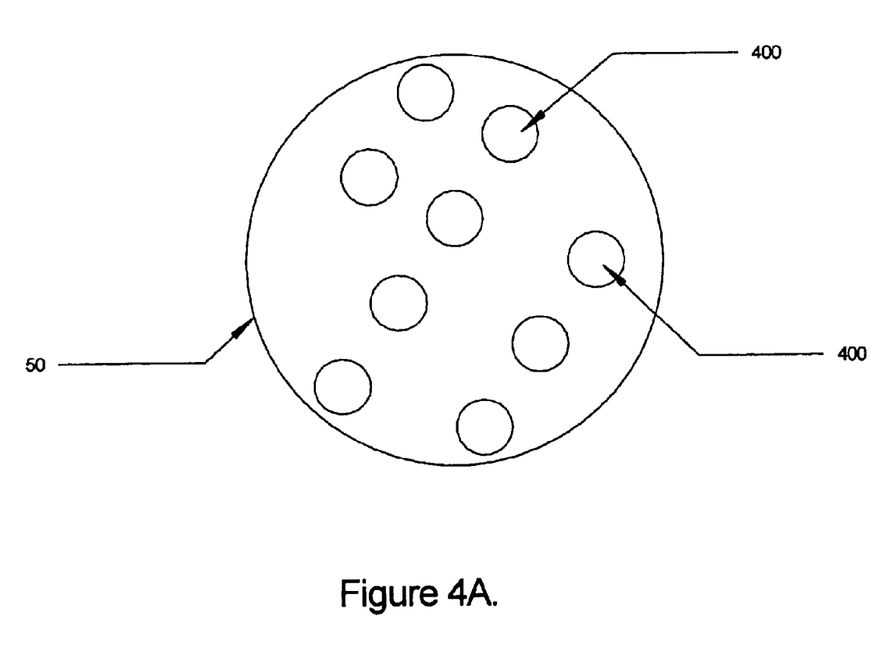
FIG. 4A is a plan view of a reactor head embodiment having nine bundle removal nozzles.
Figure 4B:
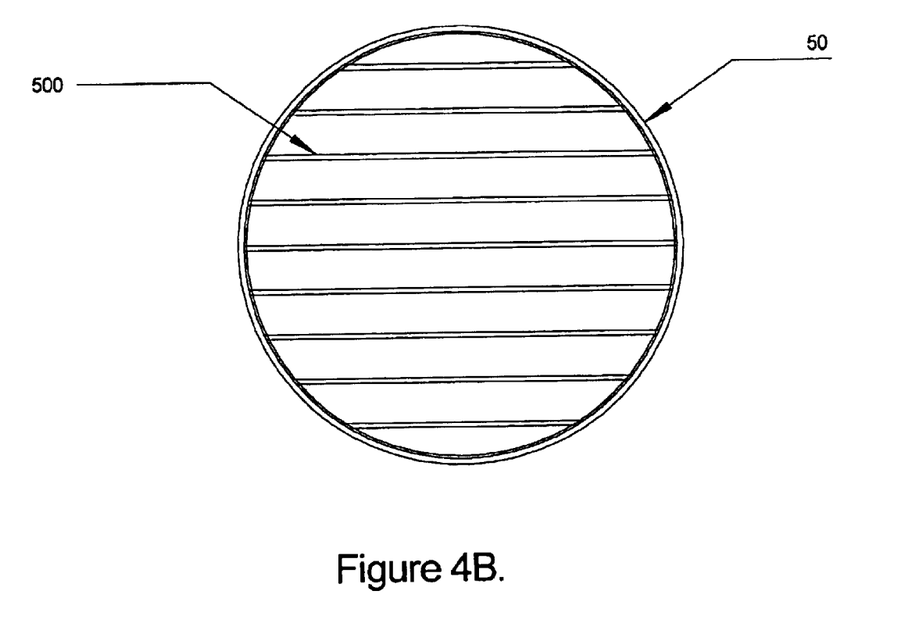
FIG. 4B is a plan view of a reactor wherein the top of the reactor is removed to show bundle support rails at a lower cross section of the reactor head.

FIG. 3 is a cross sectional elevation view of a reactor showing a bundle removal nozzle 400 at reactor head 50A and a bundle support rail 500 at a lower cross section 50B of reactor 50. As shown in FIG. 4A, the disclosed embodiment reactor 50 has nine bundle removal nozzles 400 to facilitate removal of cooling tube bundle 110 (not shown). Bundle removal nozzle 400 preferably has an inside diameter of 3 ft. Each bundle removal nozzle 400 is aligned so that it is directly above a cooling tube bundle 110 (not shown) in one of nine rows of cooling tube bundles shown in FIG. 2A. Each of the nine rows of cooling tube bundles is aligned so that it is directly above one of nine bundle support beams 500 as shown in FIG. 4B.

Each cooling tube bundle 110 is attached to a boiler feed water manifold 120 by means of a boiler feed water runner 124 and a steam manifold 340 by means of a steam runner 34. Therefore, both runners must first be removed from the designated cooling tube bundle to enable access to the target cooling tube bundle. Boiler feed water runner 124 and steam runner 34 are lifted out of the way so neither will impede the removal of target cooling tube bundle 110 from reactor 50 by means of the appropriate bundle removal nozzle 400. To move the target cooling tube bundle, it may be necessary to first remove non-targeted cooling tube bundles that obstruct the path of the targeted cooling tube bundle which requires repair.

To remove cooling tube bundle 110 from reactor 50, cooling tube bundle 110 is then moved horizontally along an underlying bundle support beam 500 until cooling tube bundle 110 is situated directly beneath a bundle removal nozzle 400 which is aligned correspondingly.

Although the present invention has been described with reference to various embodiments, numerous modifications and variations can be made and still the result will come within the scope of the invention. No limitation with respect to the specific embodiments disclosed herein is intended or should be inferred.

We claim:

1. A cooling tube arrangement for use in combination Fischer-Tropsch reactor, said cooling tube arrangement comprising:

at least one cooling tube mounted to a first and second plenum, thereby forming a bundle;

said at least one cooling tube having a center to recive boiler feed water (BFW) passing through said first plenum from a BFW manifold;

said at least one cooling tube having an annulus to carry saturated steam and excess BFW passing to said second plenum;

said saturated steam passing to a steam manifold and a steam conduit for delivery from the reactor; and wherein said bundle is mountable on a support rail in a reactor head to enable a horizontal movement of the bundle thereby facilitating removal of the bundle from a top section of the reactor.

2. The apparatus of claim 1, wherein said removable bundle further comprises a plurality of cooling tubes.

3. The apparatus of claim 2, wherein a quantity of said plurality of cooling tubes is selected based on an inside diameter of the reactor, an outside diameter of the cooling tubes, and a requisite number of cooling tubes.

4. The apparatus of claim 2, wherein said plurality of cooling tubes is preferably twelve.

5. The apparatus of claim 2, wherein said plurality of cooling tubes is preferably four.

6. The apparatus of claim 1 further comprising a plurality of removable bundles.

7. A Fischer-Tropsch reactor having an inside surface, a reactor head, and a conduit to convey boiler feed water (BFW) to a BFW manifold, said reactor comprising:

at least one cooling means to absorb an exothermic heat of reaction within the reactor, said at least one cooling means being configured for removal from the reactor as a removable bundle;

said removable bundle comprising a plurality of cooling tubes;

wherein said removable bundle is mountable on one of a plurality of support rail at a lower cross-section of the reactor head, thereby enabling a horizontal movement of the removable bundle; and a plurality of bundle removal nozzle positioned at said reactor head, each of said bundle removal nozzle means providing an egress route therethrough for the removable bundle.

8. The apparatus of claim 7, wherein the cooling means further comprises a first plenum to force BFW from the BFW manifold to a center tube of said cooling means thereby generating saturated steam in an annulus of said cooling means, said annulus carrying saturated steam and excess BFW to a second plenum forcing said saturated steam and excess BFW through to a steam manifold, whereby the saturated steam and excess BFW are carried from the reactor in a steam conduit.

9. The apparatus of claim 7 further comprising a rigging means mounted to said inside surface, to provide an anchor when the removable bundle is moved within the reactor or lifted out of the reactor.

10. The apparatus of claim 7 further comprising a traversing means to enable a movement of said removable bundle along each of said plurality of support rails, thereby facilitating the moving or removal of said removable bundle.

11. The apparatus of claim 7, wherein said removable bundle further comprises twelve cooling tubes.

12. The apparatus of claim 7, wherein said removable bundle further comprises four cooling tubes.

13. A cooling tube arrangement comprising:
a plurality of cooling tubes mounted to a first and second plenum, thereby forming a cooling tube bundle;
each of said plurality of cooling tubes having a center tube to receive boiler feed water (BFW) passing through said first plenum from a BFW manifold;
each of said plurality of cooling tubes having an annulus wherein saturated steam and excess BEW pass through to said second plenum to a steam manifold, whereby the saturated steam and excess BFW are carried from the reactor in a steam conduit;
wherein said cooling tube bundle is mountable on one of a plurality of support rails at a lower cross-section of a reactor head to enable a horizontal movement of the cooling tube bundle; and
wherein said cooling tube bundle is removable from the reactor by means of one of a plurality of bundle removal nozzles positioned at a top section of the reactor.

14. A process for arranging cooling tubes in a reactor to facilitate a removal of the cooling tubes from the reactor, said process comprising:
mounting a plurality of cooling tubes to a first and second plenum, thereby forming a cooling tube bundle; and
mounting said cooling tube bundle on one of a plurality of support rails to enable a horizontal movement of the cooling tube bundle within the reactor, said cooling tube bundle being positionable below one of a plurality of bundle removal nozzles penetrating a head section of said reactor, each of said plurality of support rails located at a lower cross section of the reactor head.

15. A process of replacing cooling tubes from a reactor, said reactor having an inside surface, a reactor head, and a conduit to convey boiler feed water (BFW) to a plurality of boiler feed water runners and saturated steam and excess BFW from a plurality of steam runners, each of said plurality of boiler feed water runners and steam runners connected to a cooling tube bundle, said process comprising:
selecting a cooling tube bundle to be removed, wherein said cooling tube bundle comprises a plurality of cooling tubes mounted to a first and second plenum, said cooling tube bundle being supported on one of a plurality of support rails at a lower cross section of the reactor head;
removing an associated boiler feed water runner and an associated steam runner from said cooling tube bundle to enable access to said cooling tube bundle;
anchoring the cooling tube bundle to the inside surface of the reactor to provide cooling tube bundle stability when the cooling tube bundle is moved;
maneuvering said cooling tube bundle in a horizontal direction along said support rail within said reactor to position said cooling tube bundle below one of a plurality of bundle removal nozzles penetrating the reactor head; and
lifting said cooling tube bundle out of the reactor by passing said cooling tube bundle through an overlying bundle removal nozzle.

16. The process of claim 15, further comprising the step of lifting the cooling tube bundle to enable a placement of a moving device underneath the cooling tube bundle on said support rail.

17. The process of claim 15, further comprising the step of installing a replacement cooling tube bundle.

18. A process of replacing cooling tubes from a reactor, said reactor having an inside surface, a reactor head, and a conduit to convey boiler feed water to a plurality of boiler feed water (BFW) runners and saturated steam and excess BFW from a plurality of steam runners, each of said plurality of boiler feed water runners and steam runners connected to a cooling tube bundle, said process comprising:
selecting a cooling tube bundle to be removed, wherein said cooling tube bundle comprises a plurality of cooling tubes mounted to a first and second plenum, said cooling tube bundle being supported on one of a plurality of support rails at a lower cross section of the reactor head;
designating said cooling tube bundle to be damaged or undamaged;
removing an associated boiler feed water runner and an associated steam runner from said cooling tube bundle to enable access to said cooling tube bundle;
anchoring the cooling tube bundle to the inside surface of the reactor to provide stability when the cooling tube bundle is moved;
maneuvering said cooling tube bundle in a horizontal direction along said support rail within said reactor to position said cooling tube bundle below one of a plurality of bundle removal nozzles penetrating the reactor head;
lifting said cooling tube bundle out of the reactor by passing said cooling tube bundle through an overlying bundle removal nozzle; and
installing a replacement cooling tube bundle if said cooling tube bundle was designated as damaged.

19. The process of claim 18, further comprising the step of removing from the reactor at least one cooling tube bundle designated as undamaged to enable a removal of a damaged cooling tube bundle.

20. The process of claim 19, further comprising the step of reinstalling in the reactor the at least one cooling tube bundle designated as undamaged.

21. The process of claim 18, further comprising the step of lifting the cooling tube bundle to enable a placement of a moving device means underneath the cooling tube bundle on said support rail.

22. A cooling tube arrangement for use in combination with a Fischer-Tropsch reactor, said reactor having an inside surface, a reactor head, and a conduit to convey boiler feed water (BFW) to a BFW manifold, said cooling tube arrangement comprising:
a plurality of cooling tubes forming a cooling means to absorb an exothermic heat of reaction within the reactor;
said cooling means having a first plenum to force BFW from the BFW manifold to a center of reach of said cooling means, each of said centers thereby generating saturated steam in an annulus of each of said cooling means;

said cooling means having a second plenum to force said saturated steam through to a steam manifold, whereby the saturated steam and excess BFW are carried from the reactor in a steam conduit; and wherein said cooling means is mountable on one of a plurality of support rails in a reactor head to enable a horizontal movement of the cooling means and to facilitate removal of the cooling means form one of a plurality of egress nozzles from the reactor head.

* * * * *